United States Patent
Amin

(10) Patent No.: US 10,439,882 B2
(45) Date of Patent: Oct. 8, 2019

(54) VIRTUALIZED NETWORKING APPLICATION AND INFRASTRUCTURE

(71) Applicant: T-Mobile USA, Inc., Bellevue, WA (US)

(72) Inventor: Rahul Amin, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 277 days.

(21) Appl. No.: 15/352,223

(22) Filed: Nov. 15, 2016

(65) Prior Publication Data
US 2018/0139099 A1    May 17, 2018

(51) Int. Cl.
| | |
|---|---|
| *H04L 12/24* | (2006.01) |
| *H04L 29/08* | (2006.01) |
| *H04L 29/12* | (2006.01) |
| *H04L 12/751* | (2013.01) |
| *H04L 12/803* | (2013.01) |
| *H04L 12/26* | (2006.01) |

(52) U.S. Cl.
CPC .............. *H04L 41/12* (2013.01); *H04L 45/02* (2013.01); *H04L 47/125* (2013.01); *H04L 61/2007* (2013.01); *H04L 67/34* (2013.01); *H04L 41/082* (2013.01); *H04L 43/10* (2013.01); *H04L 67/10* (2013.01)

(58) Field of Classification Search
CPC . H04L 41/12; H04L 12/4641; H04L 12/6418; H04L 43/0817; H04L 45/02; H04L 45/586; H04L 49/70
See application file for complete search history.

(56) References Cited

U.S. PATENT DOCUMENTS

| | | | | |
|---|---|---|---|---|
| 7,673,056 | B1 * | 3/2010 | Inbaraj | H04L 67/16 709/217 |
| 8,107,397 | B1 * | 1/2012 | Bagchi | H04L 9/0822 370/254 |
| 8,634,316 | B2 * | 1/2014 | Rosenberg | H04L 45/02 370/252 |
| 9,203,701 | B2 * | 12/2015 | Koponen | H04L 41/0893 |
| 9,350,751 | B2 * | 5/2016 | Silva | G06F 9/45533 |
| 9,787,559 | B1 * | 10/2017 | Schroeder | H04L 41/5038 |

(Continued)

*Primary Examiner* — Shean Tokuta
(74) *Attorney, Agent, or Firm* — Lee & Hayes, P.C.

(57) ABSTRACT

Systems, devices, and techniques described herein are directed to a virtualized networking topology decoupling networking objects from an underlying physical topology. A virtualized networking topology can include networking application objects implementing various networking specifications independent of a networking node or a physical topology of the network to render services to the network. A network forwarding module can render services such as routing and forwarding of packets to the networking application objects. A topology module can probe a network to develop a physical layout of the network by determining connections among ports. And a mapping module can intelligently map networking application objects with the physical topology and various forwarding and routing protocols to build the virtualized networking topology. Networking application objects can be implemented on various networking nodes and located independent of a physical topology of the network, while forwarding and control planes can be updated automatically for directing network traffic.

20 Claims, 7 Drawing Sheets

(56) References Cited

U.S. PATENT DOCUMENTS

| | | | |
|---|---|---|---|
| 9,898,318 B2* | 2/2018 | Bugenhagen | G06F 9/45558 |
| 9,973,375 B2* | 5/2018 | Shatzkamer | G06F 9/455 |
| 9,986,279 B2* | 5/2018 | Harrison | H04N 21/2668 |
| 10,091,028 B2* | 10/2018 | Koponen | H04L 12/66 |
| 2003/0185205 A1* | 10/2003 | Beshai | H04L 41/0816 |
| | | | 370/370 |
| 2009/0142056 A1* | 6/2009 | Bernstein | H04J 14/0227 |
| | | | 398/49 |
| 2010/0027420 A1* | 2/2010 | Smith | G06F 9/4856 |
| | | | 370/235 |
| 2011/0265077 A1* | 10/2011 | Collison | G06F 8/71 |
| | | | 717/172 |
| 2011/0307619 A1* | 12/2011 | Ogura | H04L 51/14 |
| | | | 709/228 |
| 2013/0332767 A1* | 12/2013 | Fox | G06F 15/167 |
| | | | 714/4.3 |
| 2015/0043378 A1* | 2/2015 | Bardgett | H04L 12/4641 |
| | | | 370/254 |
| 2015/0052522 A1* | 2/2015 | Chanda | G06F 9/455 |
| | | | 718/1 |
| 2015/0113142 A1* | 4/2015 | Adolph | H04L 47/70 |
| | | | 709/226 |
| 2015/0121476 A1* | 4/2015 | Zheng | H04L 45/02 |
| | | | 726/4 |
| 2015/0124645 A1* | 5/2015 | Yadav | H04L 41/0806 |
| | | | 370/254 |
| 2015/0334045 A1* | 11/2015 | Tremblay | H04L 47/783 |
| | | | 709/226 |
| 2016/0006642 A1* | 1/2016 | Chang | H04L 45/02 |
| | | | 370/252 |
| 2016/0105471 A1* | 4/2016 | Nunes | H04L 12/4633 |
| | | | 709/228 |
| 2016/0173338 A1* | 6/2016 | Wolting | H04L 41/145 |
| | | | 709/223 |
| 2016/0182684 A1* | 6/2016 | Connor | G06F 9/45558 |
| | | | 709/203 |
| 2016/0309244 A1* | 10/2016 | Ma | H04Q 11/0005 |
| 2016/0352634 A1* | 12/2016 | Itsumi | H04L 12/6418 |
| 2016/0380831 A1* | 12/2016 | Shevenell | H04L 41/0816 |
| | | | 370/254 |
| 2017/0034051 A1* | 2/2017 | Chanda | H04L 45/586 |
| 2017/0078198 A1* | 3/2017 | Nellikar | H04L 45/745 |
| 2017/0078922 A1* | 3/2017 | Raleigh | H04W 28/10 |
| 2017/0104679 A1* | 4/2017 | Sunavala | G06F 9/45558 |
| 2017/0214612 A1* | 7/2017 | Leitner | H04L 45/586 |
| 2017/0302530 A1* | 10/2017 | Wolting | H04L 41/0896 |
| 2017/0331669 A1* | 11/2017 | Ganesh | H04L 41/0213 |
| 2017/0345281 A1* | 11/2017 | Shaw | H04L 41/0816 |
| 2017/0359231 A1* | 12/2017 | Chawki | H04L 41/0806 |
| 2018/0069809 A1* | 3/2018 | Oswal | H04L 49/351 |
| 2018/0123932 A1* | 5/2018 | Shaw | H04L 47/24 |
| 2018/0191561 A1* | 7/2018 | You | G06F 9/45558 |
| 2018/0212895 A1* | 7/2018 | Szabo | H04L 41/5041 |

* cited by examiner

VIRTUALIZED NETWORKING APPLICATION AND INFRASTRUCTURE

BACKGROUND

Modern networking systems include various layers of networking components to provide high-speed transmission of data between devices. A core layer generally provides a network backbone including high-speed switches and fiber-optic cables, for example. A distribution layer generally includes routers and switches to aggregate and route data packets between layers. An access layer can generally provide access to user devices to a network. Prior art networking models rely on deploying various networking components comprising the various layers, with each networking component having platform specific requirements and functionalities tied to the physical networking components. However, prior art deployment of networking components takes immense effort and is further aggravated when it comes to design and topology changes, software upgrades and validation, monitoring, and troubleshooting, as examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein are directed to a virtualized networking topology decoupling networking objects from an underlying physical topology. A virtualized networking topology can include one or more networking application objects which can implement various networking specifications independent of a networking node or a physical topology of the network to render services to the network. Further, the virtualized networking topology can include a network forwarding module that can render services such as routing and forwarding of packets to the networking application objects. A topology module can probe a network to develop a physical layout of the network by determining connections among ports. And a mapping module can intelligently map networking application objects implemented on network nodes with the physical topology and various forwarding and routing protocols to build the virtualized networking topology. Networking application objects can be implemented on various networking nodes and located independent of a physical topology of the network, while forwarding and control planes can be updated automatically for directing network traffic. These and other aspects of the disclosure are discussed herein.

In this manner, the systems, devices, and techniques described herein improve a functioning of a computing device by decoupling a network implementation from an underlying physical topology, thereby allowing networking application objects to be implemented across networking nodes and moved easily during network upgrades, congestion, or to optimize network traffic. In some instances, networking application objects can be implemented in software and deployed on various hardware components having capabilities that match a specification of the networking application objects. In a case where a hardware component is unable to support a networking application object, the networking application object can be easily moved and implemented in another networking node without being limited to one physical location. In some instances, the mapping module can intelligently and automatically update routing and forwarding information of the network as the virtual topology or physical topology changes. In some instances, a centralized server is provided to efficiently manage the virtualized networking topology to determine network traffic associated with malicious attacks and to implement networking application objects on a protected network node. In some instances, the networking application objects can be upgraded via a change in software configuration rather than a hardware change. These and other improvements to the functioning of a computer and network are discussed herein.

The systems, devices, and techniques described herein can be implemented in a number of ways. Example implementations are provided below with reference to the following figures.

Figure 1:
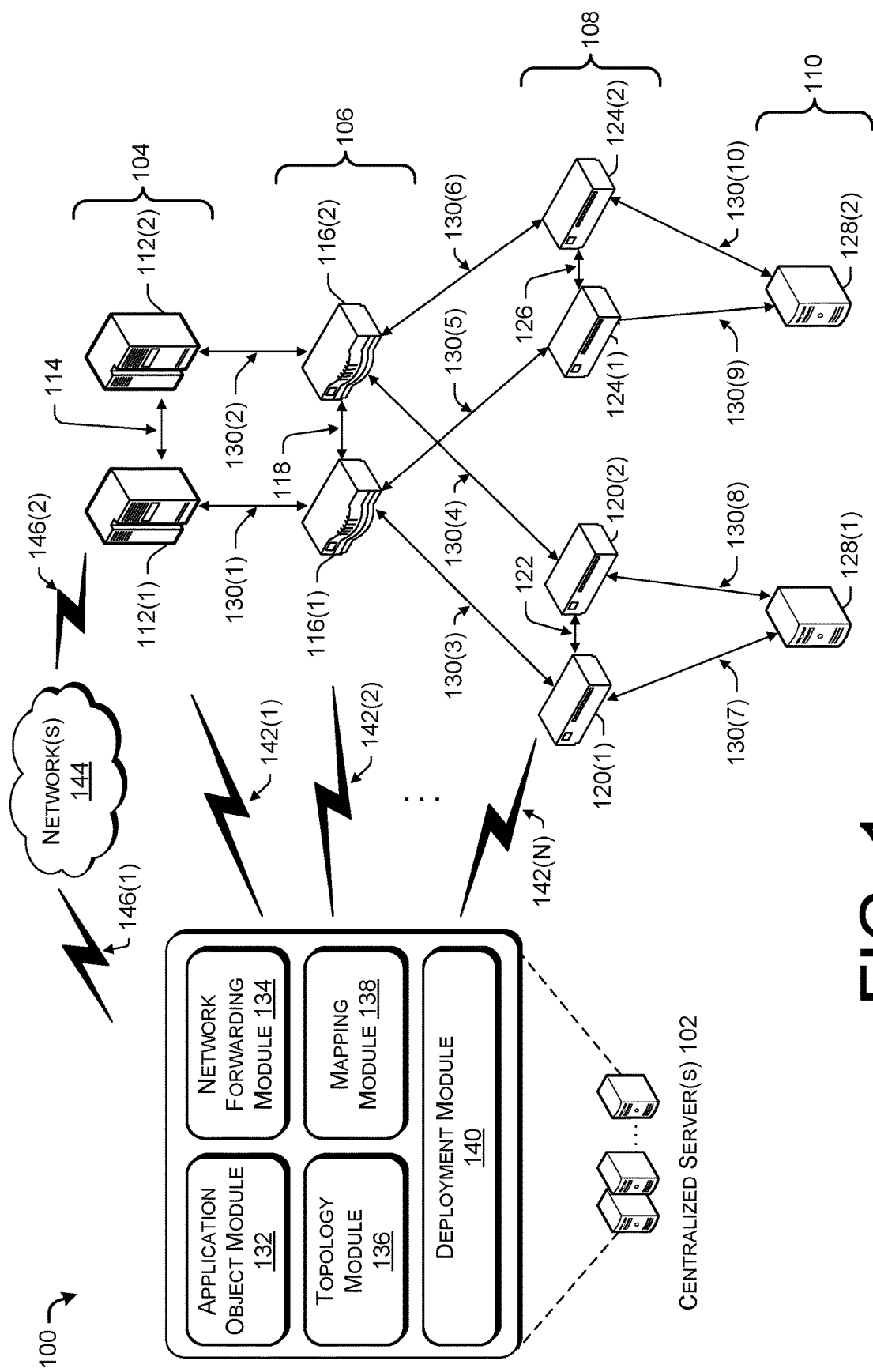
FIG. 1 illustrates an example environment including a centralized server managing a network including layers of network components.

FIG. 1 illustrates an example environment 100 including a centralized server managing a network including layers of network components. In some instances, the environment 100 can include one or more centralized server(s) 102 providing services to various networking layers 104, 106, and 108, and devices 110 of the environment 100.

In some instances, the network layer 104 may include a core layer of a network, and may include core devices 112(1) and 112(2) (referred to generally as core devices 112) physically connected via a connection 114. In some instances, the network layer 104 may include a network backbone that includes high-speed network devices to switch packets and provide high-speed data connections, such as fiber-optic cable.

In some instances, the network layer 106 may include a distribution layer of a network, and may include distribution devices 116(1) and 116(2) (referred to generally as distribution devices 116) physically connected via a connection 118. In some instances, the network layer 106 may include devices that provide routing and filtering to packets in the network and provide and manage Quality of Service (QoS) policies.

In some instances, the network layer 108 may include an access layer of a network, and may include access devices 120(1) and 120(2) (referred to generally as access devices 120) physically connected via a connection 122, and may include access devices 124(1) and 124(2) (referred to generally as access devices 124) physically connected via a connection 126. In some instances, the network layer 108 may include switches, hubs, ports, etc., to enable one or more devices (such as the devices 128(1) and 128(2)) to connect to the network.

In some instances, the devices 128(1) and 128(2) (collectively referred to as devices 128) can be any sort of device capable of engaging in wired or wireless communication with other, remote devices. Thus, the devices 128 can include, but are not limited to, servers, smart phones, mobile phones, cell phones, tablet computers, portable computers, laptop computers, personal digital assistants (PDAs), electronic book devices, or any other electronic devices that can generate, request, receive, transmit, or exchange voice, video, and/or digital data in the environment 100.

Network layers 104, 106, and 108, and devices 110 may be connected via one or more physical connections 130(1), 130(2), 130(3), 130(4), 130(5), 130(6), 130(7), 130(8), 130(9), and 130(10) (collectively referred to as the connections 130). As may be understood in the context of this disclosure, layers 104, 106, and 108, and devices 110 may include any number and/or any type of devices, and may include any number and type of connections to connect the various layers and devices. Data packets may be routed and/or forwarded along the connections 114, 118, 122, 126, and/or 130.

Any of the devices within the layers 104, 106, and 108, or the devices 110, may be considered a networking node (also referred to as a network node) hosting one or more networking application objects (also referred to as a network application object, or an application object), in accordance with embodiments of the disclosure.

Turning to the centralized server 102, the centralized server 102 may include various modules including, but not limited to, an application object module 132, a network forwarding module 134, a topology module 136, a mapping module 138, and a deployment module 140. In some instances, the centralized server 102 may communicate with one or more devices in the network layers 104, 106, and 108, and the devices 110, via one or more control connections 142(1), 142(2), . . . 142(N) (referred to collectively as control connections 142). In some instances, the control connections 142 may transmit only control message from the centralized server 102 to one or more devices of the network. In some instances, the control connections 142 may transmit data packets in the network as well. In some instances, the centralized server 102 may communicate with a network 144 and/or with other devices via one or more connections 146(1) and 146(2). Aspects of the various modules of the centralized server are discussed herein.

In some embodiments, the network 144 can comprise a mobile telecommunications network (MTN) configured to implement one or more of the second, third, and fourth generation (2G, 3G, and 4G) cellular-wireless access technologies discussed above. Thus, the MTN can implement GSM, UMTS, and/or LTE/LTE Advanced telecommunications technologies. Further, the centralized server 102 and the various devices in the layers 104, 106, and 108, and the devices 110 implementing the GSM, UMTS, LTE, LTE Advanced, and/or HSPA+ telecommunications technologies can include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate, convert, and/or route data packets between network nodes, devices, the centralized server 102, and/or remote devices in other networks. Further, it is understood in the context of this disclosure that the techniques discussed herein can also be implemented in other networking technologies, such as nodes that are part of a wide area network (WAN), metropolitan area network (MAN), local area network (LAN), neighborhood area network (NAN), personal area network (PAN), or the like.

The application object module 132 may include functionality to implement one or more networking application objects on one or more networking nodes. For example, the application object module 132 may receive network specifications from a networking engineer specifying functionality of a networking application object. Network specifications may include an Internet Protocol (IP) address and/or instructions to provide a particular service, such as implementing a transmission protocol type (e.g., BGP (internal Border Gateway Protocol), internal BGP, external BGP, etc.), QoS (Quality of Service) level, bandwidth, latency, etc. The application object module 132 may develop a networking application object (e.g., an application, executable file, configuration file, parameters, etc.) to be deployed on a particular networking node. Additional, the application object module 132 may include functionality to encapsulate the specifications (or configuration) for a particular application specification. The application object module 132 may interact with other modules on the centralized server 102, other networking nodes in the environment 100, and/or other networking application objects implemented in the environment 100.

The network forwarding module 134 may include functionality to provide IP routing to the networking application objects (and/or the application object module 132). For example, the network forwarding module 134 may interact with the topology module 136 (discussed below) to setup a forwarding plane for each networking application object in a network and/or a centralized forwarding plane for all nodes and objects in a network. That is, the network forwarding module 134 may include a global database to provide routing and forwarding to all objects and/or nodes in a network. The network forwarding module 134 may gather information from various nodes and objects in a network via the control connections 142, for example. Further, the network forwarding module 134 may provide IP networking services to the environment 100, which includes but is not limited to IP routing, traffic engineering, filtering, QoS, monitoring, and logs.

The topology module 136 may include functionality to probe networks by sending probes via the control connections 142 (e.g., a control plane) to map a physical topology of the network. For example, the topology module 136 can send a probe message or packet to a particular networking node causing the networking node to append identifying information to the probe message and transmit associated probe messages via physical connections to connected ports to map connections between ports on networking nodes. The topology module 136 can periodically perform network mapping and/or can perform networking mapping based on determining that a topology of the network has changed (e.g., receiving a message indicating that device has been added or removed from the network). In some instances, the topology module 136 may operate as a background process or when a network utilization is below an activity threshold.

The mapping module 138 may include functionality to intelligently associate forwarding information associated with a networking application object with a physical topology of a network. To that end, the mapping module 138 can interact with the application object module 132, the network forwarding module 134, and/or the topology module 136 to develop forwarding planes and/or routing tables for individual devices and objects in the environment, and in some instances, the mapping module 138 may provide global mapping in a network. In some instances, the mapping module 138 can map a physical topology of the network with the various networking application objects and IP addresses to associate networking application objects, IP addresses, physical ports, and services provided by the networking application objects.

The deployment module 140 may include functionality to deploy networking application objects to one or more network nodes in the environment 100. For example, the deployment module 140 may transmit applications, settings, and/or configuration files to the network nodes to implement the networking application objects. In some instances, the deployment module 140 may move networking application objects from one network node to another network node and may provide an indication of the move to the network forwarding module 134 to update a forwarding plane of the network and/or to update a forwarding plane and/or routing table associated with a particular network node. In some instances, the deployment module 140 can receive capabilities of various network nodes and match capabilities of the nodes with specifications associated with a particular networking application object. In some instances, the deployment module 140 may block, restrict, or limit a networking application object from being implemented on a particular network node if that network node is not capable of providing or fulfilling a specification of the networking application object. In some instances, the deployment module 140 can determine an available capacity of a network node and implement a networking application object on that network node if an available capacity meets or exceeds specifications of the networking application object.

Figure 2:
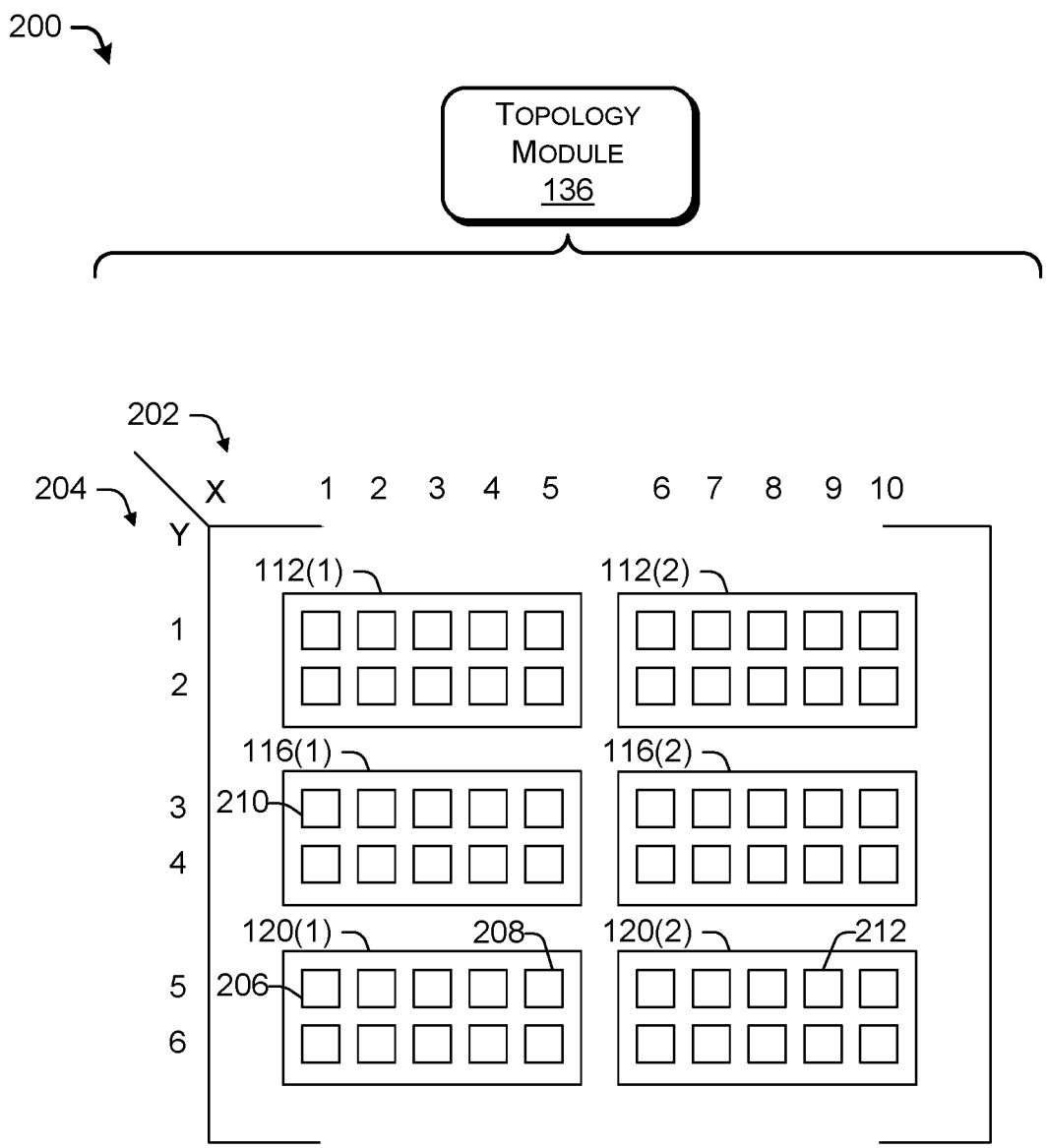
FIG. 2 illustrates an exemplary network topology matrix mapping a physical topology of a network.

FIG. 2 illustrates an exemplary network topology matrix 200 mapping a physical topology of a network. For example, the network topology matrix 200 may be implemented (e.g., generated) by the topology module 136 based on the devices in the environment 100 in FIG. 1.

For example, the network topology matrix 200 can include an N by N dimensional grid corresponding to devices on a particular network. In one example, the network topology matrix 200 includes an x-axis 202 and a y-axis 204. As illustrated, the network topology matrix 200 includes mappings of the various devices 112(1), 112(2), 116(1), 116(2), 120(1), and 120(2). Any number of devices can be includes in the network topology matrix 200, and is not limited to the devices illustrated in FIG. 2. For example, another network topology matrix may include mapping of devices including devices 124(1) and 124(2), and the connections associated with those devices. In some instances, a network topology matrix can be developed for each network node on a network, illustrating connections with that particular network node, and in some instances, a network topology matrix can be developed for an entire network to provide comprehensive understanding of the physical connections of the network.

In some instances, the device 120(1) includes a port 206 and a port 208. As may be understood, the port 206 may be represented by coordinates (1, 5) in the network topology matrix, while the port 208 may be represented by coordinates (5, 5) (e.g., corresponding to the x-coordinates and the y-coordinates in the network topology matrix). A port 210 of the device 116(1) may be represented by coordinates (1, 3) of the network topology matrix 200. By way of example, the connection 130(3) of FIG. 1 may be represented as a physical connection between the ports 206 and 210. A port 212 of the device 120(2) may be represented by coordinates (9, 5) of the network topology matrix 200. By way of example, the connection 122 of FIG. 1 may be represented as a physical connection between the ports 208 and 212. As may be understood in the context of this disclosure, a number of ports associated with a device in the network topology matrix may correspond with an actual number of physical ports associated with the hardware of the device.

As mentioned above, the topology module 136 may include functionality to probe the network to determine a physical topology of the network. Determining the physical topology of the network may include a variety of operations, based on the network topology matrix 200 introduced above. The physical interlinking connections among the ports can be mapped by sending a probe from each port and then indexing the details as described herein.

For example, a first probe can be sent by the topology module 136 via a control connection 142 to the devices in the network topology matrix 200. Upon receiving a probe, a networking node (e.g., the device 120(1)) may send a probe (e.g., trace file, message, etc.) out of each of its ports (e.g., the ports represented by (1, 5), (2, 5), (3, 5), (4, 5), (5, 5), (1, 6), (2, 6), (3, 6), (4, 6), and (5, 6)). In some instances, the device 120(1) may only send probes out of ports that are connected to various devices in the network. For example, probes may be sent out from ports 206 and 208 to the ports of the connected devices 116(1) and 120(2), which is to say ports 210 and 212, respectively. The device 120(2) may receive a probe sent to the port 212 and may add information associated with the device 120(2) to the probe, and transmit an updated probe to the topology module 136 on the centralized server 102 to generate a topology map of the environment 100. For example, a probe sent to the centralized server 102 after being transmitted through the devices 120(1) and 120(2) may include associations between coordinates (5, 5) (e.g., the port 208), and (9, 5) (e.g., the port 212), thereby indicating a physical connection between the port 208 and the port 212. Additional information associated with each connection may include device capabilities, transmission protocols, IP addresses associated with the respective ports, latency, QoS, etc.

In some instances, the topology module 136 can send probes to each port in the network to determine physical connections of the network.

Figure 3:
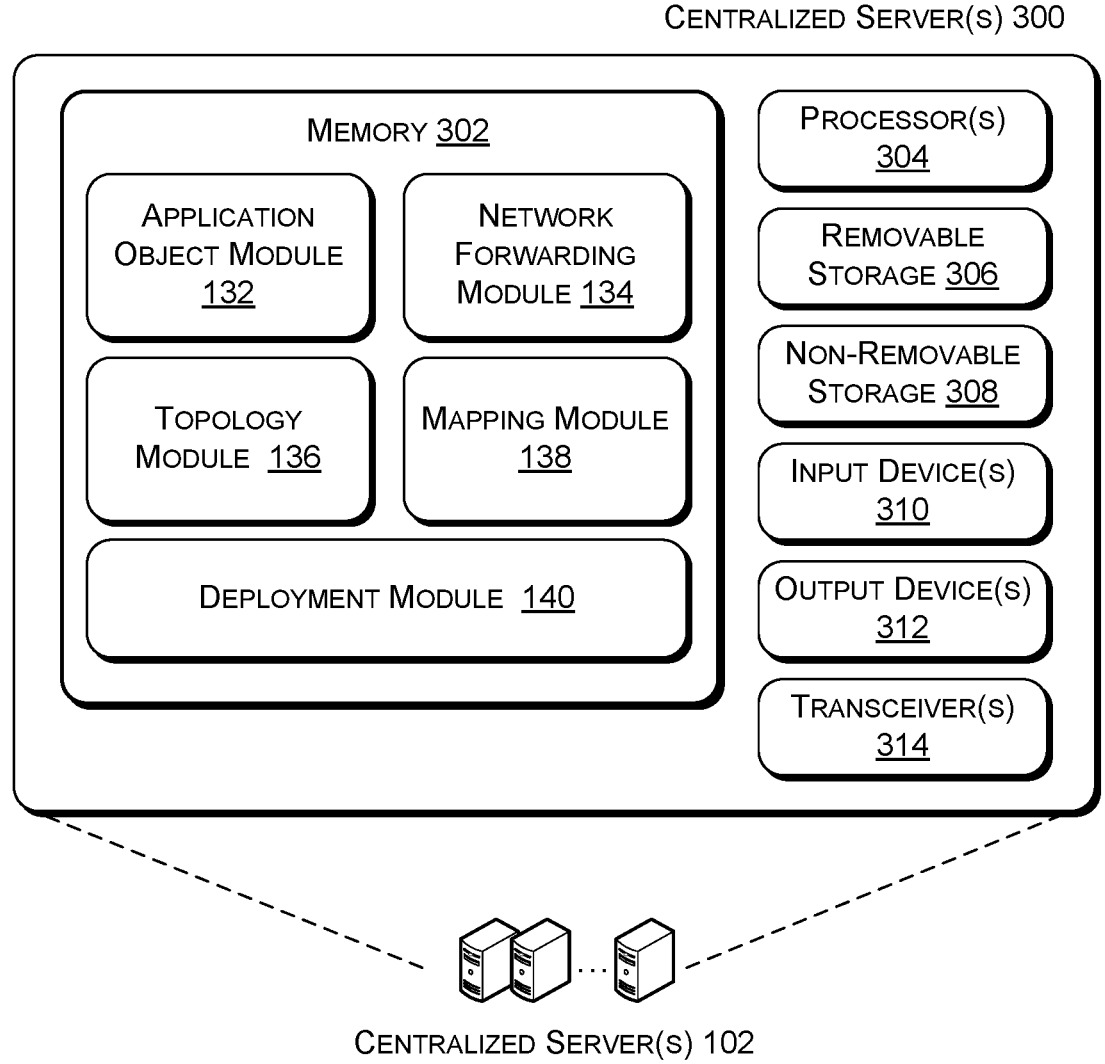
FIG. 3 illustrates an example centralized server configured to manage network components.

FIG. 3 illustrates an example centralized server 300 configured to manage network components. In some embodiments, the centralized server 300 can correspond to the centralized server 102 of FIG. 1. It is to be understood in the context of this disclosure that the centralized server 300 can be implemented as a single device or as a plurality of devices with modules and data distributed among them. For example, the application object module 132, the network forwarding module 134, the topology module 136, the mapping module 138, and the deployment module 140 can provide functionality to the centralized server 300 to apply one or more networking application objects to one or more network nodes to decouple the network functionality from the underlying physical topology of the network, as described herein.

As illustrated, the centralized server 300 comprises a memory 302 storing the application object module 132, the network forwarding module 134, the topology module 136, the mapping module 138, and the deployment module 140. In some instances, the centralized server 300 may include any number of modules describe herein (e.g., the centralized server 300 may include a plurality of application object modules 132). Also, the centralized server 300 includes processor(s) 304, a removable storage 306 and non-removable storage 308, input device(s) 310, output device(s) 312, and transceiver(s) 314.

In various embodiments, memory 302 is volatile (such as RAM), nonvolatile (such as ROM, flash memory, etc.) or some combination of the two. The application object module 132, the network forwarding module 134, the topology module 136, the mapping module 138, and the deployment module 140 stored in the memory 302 can comprise methods, threads, processes, applications or any other sort of executable instructions. The application object module 132, the network forwarding module 134, the topology module 136, the mapping module 138, and the deployment module 140 can also include files and databases.

In some embodiments, the processor(s) 304 is a central processing unit (CPU), a graphics processing unit (GPU), or both CPU and GPU, or other processing unit or component known in the art.

The centralized server 300 also includes additional data storage devices (removable and/or non-removable) such as, for example, magnetic disks, optical disks, or tape. Such additional storage is illustrated in FIG. 3 by removable storage 306 and non-removable storage 308. Tangible computer-readable media can include volatile and nonvolatile, removable and non-removable media implemented in any method or technology for storage of information, such as computer readable instructions, data structures, program modules, or other data. Memory 302, removable storage 306 and non-removable storage 308 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the centralized server 300. Any such tangible computer-readable media can be part of the centralized server 300.

The centralized server 300 also can include input device(s) 310, such as a keypad, a cursor control, a touch-sensitive display, voice input device, etc., and output device(s) 312 such as a display, speakers, printers, etc. These devices are well known in the art and need not be discussed at length here.

As illustrated in FIG. 3, the centralized server 300 also includes one or more wired or wireless transceiver(s) 314. For example, the transceiver(s) 314 can include a network interface card (NIC), a network adapter, a LAN adapter, or a physical, virtual, or logical address to connect to the connections 114, 118, 122, 126, 130, 142, and/or 146, and network(s) 144, or the devices of the various layers 104, 106, and 108, and the devices 110. To increase throughput when exchanging wireless data, the transceivers 314 can utilize multiple-input/multiple-output (MIMO) technology. The transceiver(s) 314 can comprise any sort of wireless transceivers capable of engaging in wireless, radio frequency (RF) communication. The transceivers 314 can also include other wireless modems, such as a modem for engaging in Wi-Fi, WiMax, Bluetooth, or infrared communication.

Figure 4:
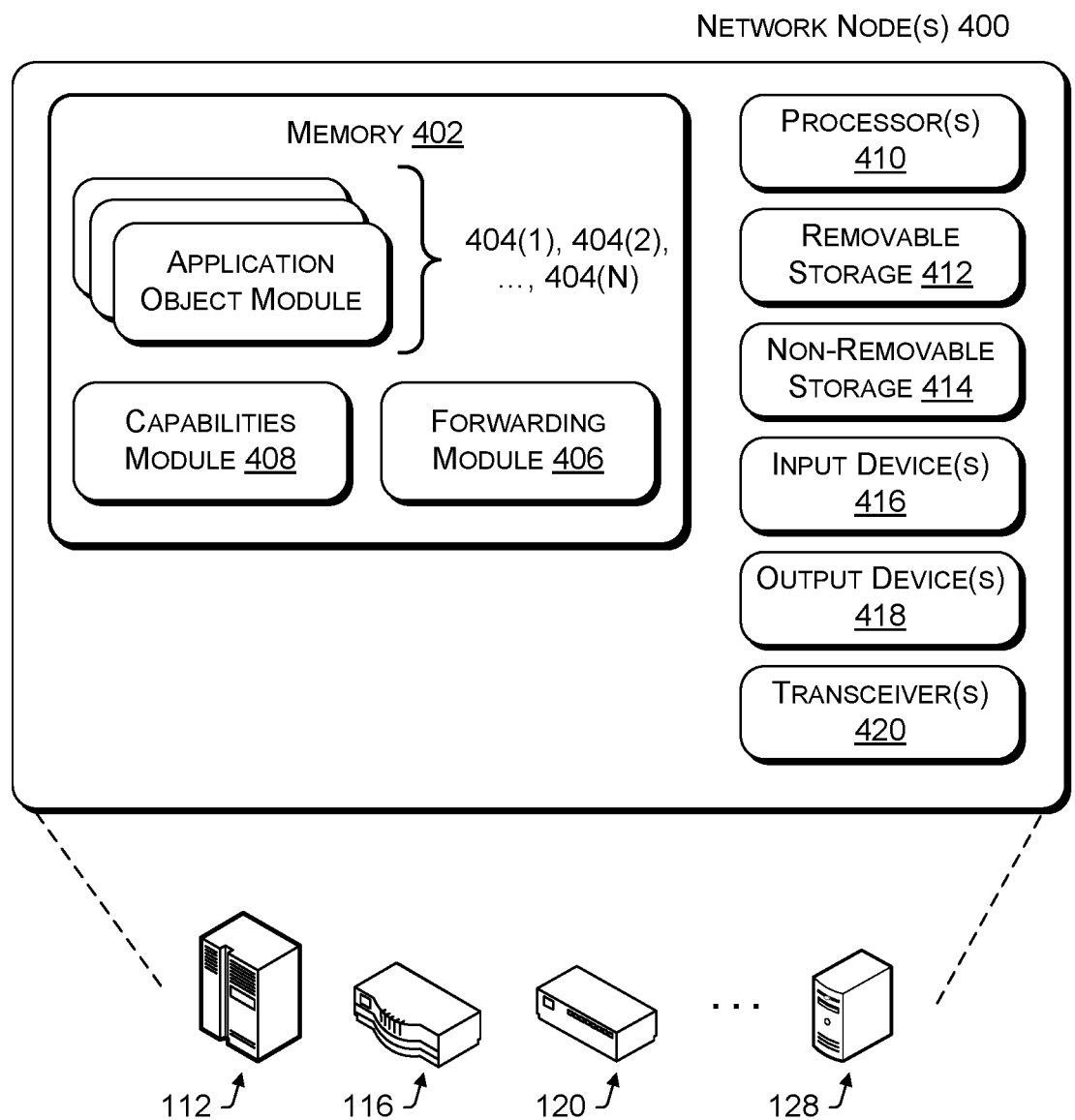
FIG. 4 illustrates an example network node including at least one application object module.

FIG. 4 illustrates an example network node 400 including at least one application object module. In some embodiments, the network node 400 can correspond any of the devices comprising the layers 104, 106, and 108, and devices 110 of FIG. 1. As illustrated, the network node 400 comprises a memory 402 storing application object modules 404(1), 404(2), . . . , 404(N) (collectively or individually referred to as the application object module 404), a forwarding module 406, and a capabilities module 408. Also, the network node 400 includes processor(s) 410, a removable storage 412 and non-removable storage 414, input device(s) 416, output device(s) 418, and transceiver(s) 420.

In various embodiments, memory 402 is volatile (such as RAM), nonvolatile (such as ROM, flash memory, etc.) or some combination of the two. The application object module 404, the forwarding module 406, and the capabilities module 408 stored in the memory 402 can comprise methods, threads, processes, applications or any other sort of executable instructions. The application object module 404, the forwarding module 406, and the capabilities module 408 can also include files and databases.

In some embodiments, the application object module 404 can correspond to the application object module 132 of FIG. 1. In some instances, the application object module 404 can include one or more networking application objects received from the centralized server 102 to provide virtualized networking services to the networks. In some embodiments, the module operations in the network node 400 can be performed in parallel with the module operations in the centralized server 300. In some embodiments, various modules can be used to check the processing determined by the other modules. In some instances, the application object module 404 can include a networking application object associated with one or more ports of the network node 404, for example. A application object module 404 may include one or more IP addresses, and may be configured to communicate with other network nodes or other network devices via one or more protocols, such as BGP (Border Gateway Protocol), OSPF (Open Shortest Path First), IS-IS (Intermediate System to Intermediate System), distance-vector routing protocols, Routing Information Protocol, Path Vector Routing Protocol, OpenFlow, etc. The application object module 404 may be configured to provide various services to a network (e.g., routing, filtering, forwarding, etc.).

In some embodiments, the forwarding module 406 can include one or more forwarding tables or routing tables associated with the application object module 404. For example, the forwarding module 406 can be decoupled with the physical topology of the network such that the forwarding module 406 may forward packets between various networking application objects, independent of where the networking application objects are located in the network. In some instances, the forwarding module 406 can be provided by the centralized server 102 following the development of the physical architecture of the network and mapping a network node to a networking application object. In some instances, the forwarding module 406 is configured to determine where to route packets as the packets are received by the network node. For example, the forwarding module 406 may include a table that looks up a destination address of the incoming packet and determines a path from the network node 400 to the ultimate destination. In some instances, the forwarding module 406 may determine not to forward a packet (e.g., drop a packet if the packet is determined to be associated with attack traffic).

In some embodiments, the capabilities module 408 may include a data store including capabilities of the network node 400 and/or available capabilities of the network node 400 based on the number and/or type of networking application objects currently running or implemented on the network node 400. In some instances, the capabilities module 408 can provide capabilities to the centralized server 102 to determine whether the network node 400 includes capabilities to implement a networking application object including particular application specifications. In some instances, the capability module 408 can be updated based on a measured QoS or response time of the network node 400. In some instances, the capability module 408 can be updated based upon a software or firmware upgrade associated with the network node 400.

In some embodiments, the processor(s) 410 is a central processing unit (CPU), a graphics processing unit (GPU), or both CPU and GPU, or other processing unit or component known in the art.

The network node 400 also includes additional data storage devices (removable and/or non-removable) such as, for example, magnetic disks, optical disks, or tape. Such additional storage is illustrated in FIG. 4 by removable storage 412 and non-removable storage 414. Tangible computer-readable media can include volatile and nonvolatile, removable and non-removable media implemented in any method or technology for storage of information, such as computer readable instructions, data structures, program modules, or other data. Memory 402, removable storage 412 and non-removable storage 414 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network node 400. Any such tangible computer-readable media can be part of the network node 400.

Network node 400 can include input device(s) 416, such as a keypad, a cursor control, a touch-sensitive display, etc. Also, the network node 400 can include output device(s) 418, such as a display, speakers, etc. These devices are well known in the art and need not be discussed at length here.

As illustrated in FIG. 4, the network node 400 can include one or more wired or wireless transceiver(s) 420. In some wireless embodiments, to increase throughput, the transceiver(s) 420 can utilize multiple-input/multiple-output (MIMO) technology. The transceiver(s) 420 can be any sort of wireless transceivers capable of engaging in wireless, radio frequency (RF) communication. The transceiver(s) 420 can also include other wireless modems, such as a modem for engaging in Wi-Fi, WiMax, Bluetooth, or infrared communication.

Figure 5:
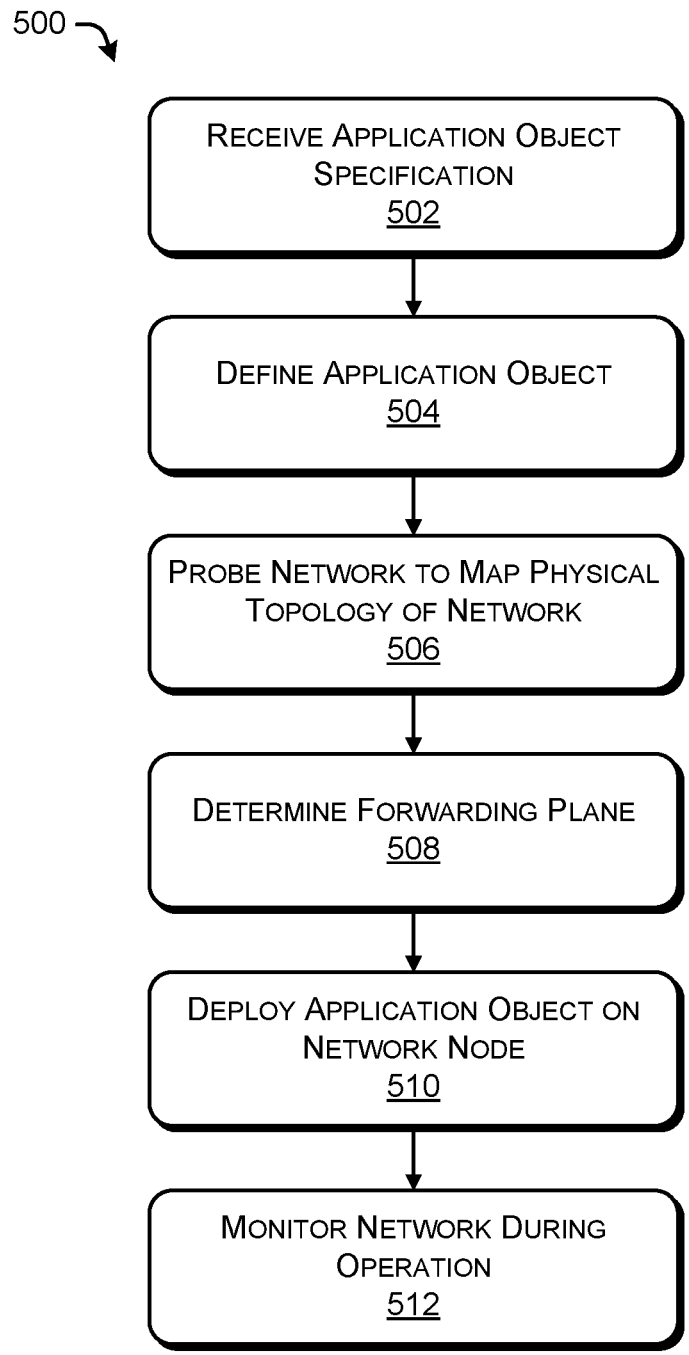
FIG. 5 illustrates an example process for defining network application objects and deploying the network application objects in a virtualized networking topology.
Figure 6:
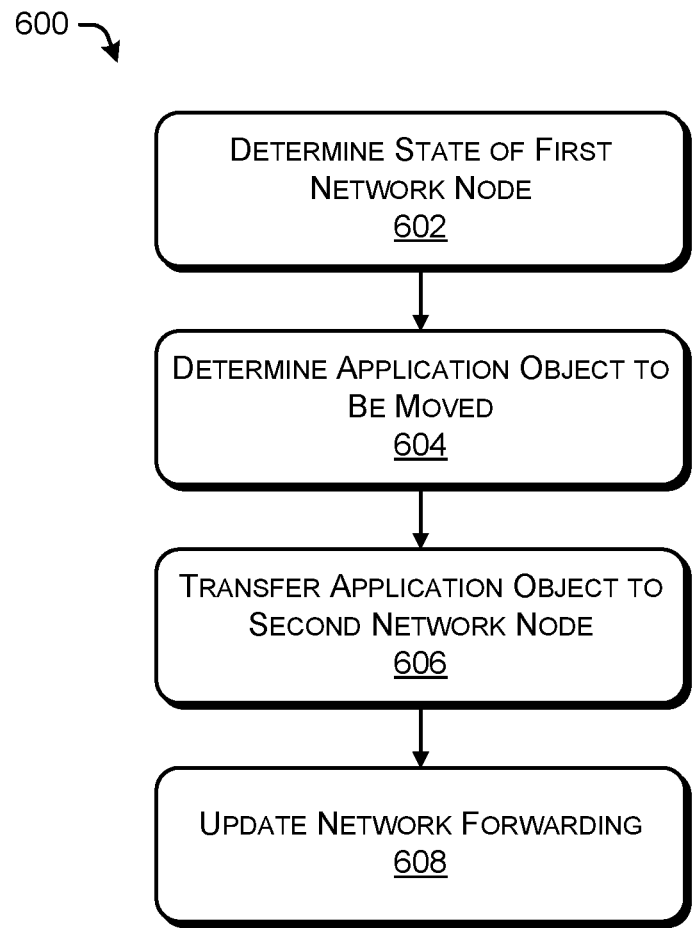
FIG. 6 illustrates an example process for transferring a network object independent of a physical network topology.
Figure 7:
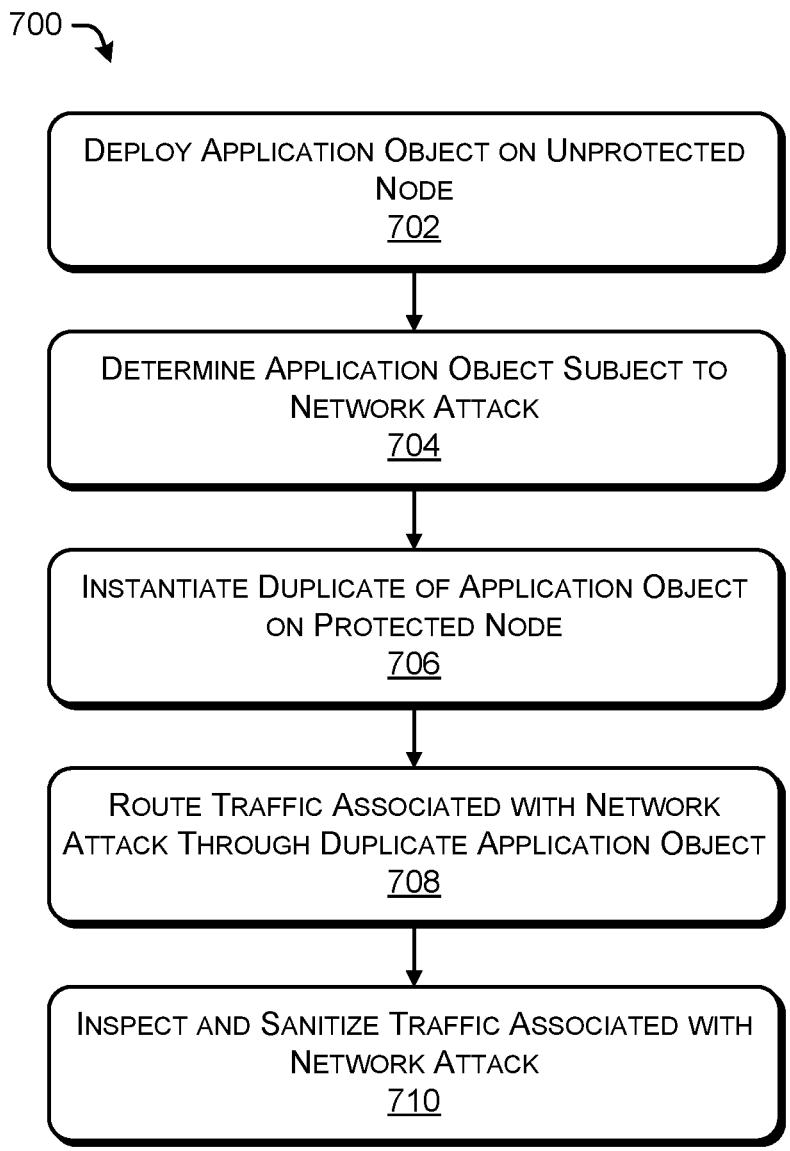
FIG. 7 illustrates an example process for instantiating a network object on a protected node during a network attack associated with an unprotected network node.

FIGS. 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for defining network application objects and deploying the network application objects in a virtualized networking topology. The example process 500 can be performed by the centralized server 102, for example. Some or all of the process 500 can be performed by one or more network nodes or devices in the environment 100.

At 502, the operation can include receiving an application object specification to be implemented in a virtualized network. For example, a networking engineer may provide a specification of features or functions that an application object is to provide in a network, such as packet forwarding, filtering, encrypting, shaping, etc. Aspects of the specification may include one or more communication protocols, IP addresses, locations within a network to be implemented, QoS specifications, bandwidth, latency, scheduling, etc.

At 504, the operation can include defining an application object. For example, the application object defined in the operation 504 can include developing an application and/or configuration files to be implemented on a network node to provide the services specified in the operation 502. In some instances, this operation can include assigning an IP address to the application object.

At 506, the operation can include probing a network to map a physical topology of the network. As described herein, a centralized server 102 can send probes (e.g., trace files or messages) via a control plane to the various network nodes of the network. The network nodes can assign coordinates to each port of the network node and can include port information with an updated probe as the network node transmits a second probe from each port. As probes are received at other network nodes, the receiving network node can append additional receiving port information and transmit the information back to the centralized server 102. This operation 506 can be repeated for each port of each network node on a network. Probes can be correlated and a physical topology can be determined for some or all of the network.

At 508, the operation can include determining a forwarding plane for various nodes of the network. In some instances, a forwarding plane can be determined for each network node and provided to each network node, and in some cases, a network-wide forwarding plane can be determined and managed at the centralized server 102. In some instances, the forwarding plane can be based on the physical topology of the network nodes. In some instances, the forwarding plane can be based on IP addresses associated with the network application objects that are independent of the physical topology. In some instances, the forwarding plane can be determined and updated to balance traffic operations in the network, for example, upon determining attack traffic in the network or upon determining that a network node is under-utilized or over-utilized.

At 510, the operation can include deploying the application object on a network node. For example, the operation can include transmitting a program, parameters, configuration files, etc. to a network node that has capabilities to implement the specification associated with the network node. Further, the operation 510 can include installing the network object on the network node, and routing traffic to and from the network object. In some instances, the operation 506 can include updating various forwarding planes in the network to reflect that the application object can provide services to the network.

At 512, the operation can include monitoring the network during operation of the network. For example, this operation 512 can include monitoring QoS of the network to determine if the resources in the network can handle the traffic in the network. In some instances, the operation 512 can include determining if attack traffic is directed at an application object or a particular network node. In some instances, the operation 512 can include determining that a physical topology of the network has changed (e.g., by adding or removing a network node). In some instances, the operation 512 can include receiving status messages or updates from various components of the network.

FIG. 6 illustrates an example process 600 for transferring a network object independent of a physical network topology. The example process 600 can be performed by the centralized server 102, for example. Some or all of the process 600 can be performed by one or more network nodes or devices in the environment 100.

At 602, the operation can include determining a state of a first network node. For example, the first network node can be hosting an application object that is providing virtualized network services to the network. In some instances, the state of the first network node can include a Quality of Service (QoS) provided by the first network node. In some instances, the state of the first network node can be based at least in part on a number of packets in a network queue, a number of dropped packets, latency, a number of denied connections, relative or absolute amounts of traffic, relative or absolute increases or decreases of traffic or rates of traffic, etc.

At 604, the operation can include determining that an application object implemented on the first network node can be moved to another network node. In some instances, the operation 604 can include determining that the first network node is under attack or cannot provide services or does not have sufficient capacity or capabilities to implement some or all of the services associated with the specification of the application object. In some instances, a plurality of application objects may be implemented on the first network node, and the operation 604 may include selecting from the plurality of application objects, the application object to be moved to another network node. In some instances, the operation 604 can be independent of an underlying network topology.

At 606, the operation can include transferring the application object to a second network node. In some instances, the operation 606 can include determining the capabilities of the second network node and determining that the capabilities meet or exceed a specification associated with the application object. In some instances, a portion of capabilities can be provided by a single network node, and the application object can be instantiated across a plurality of network nodes.

At 608, the operation can include updating a networking forwarding. In some instances, the operation 608 can include updating a forwarding plane at the first network node, the second network node, and/or the centralized server 102, for example. In some instances, the operation 608 can include updating a routing table and/or rules for forwarding packets among various networking nodes. In some instances, the operation 608 can include updating an associated between an IP address associated with the application object and an underlying port associated with the first networking node and the second networking node.

FIG. 7 illustrates an example process 700 for instantiating a network object on a protected node during a network attack associated with an unprotected network node. The example process 700 can be performed by the centralized server 102, for example. Some or all of the process 700 can be performed by one or more network nodes or devices in the environment 100.

At 702, the operation can include deploying an application object on an unprotected node. In some instances, the unprotected node may have been a protected node, but over time (e.g., due to not updating a protocol, not updating firmware, etc.) may have become an unprotected node. In some instances, the application object operating on the network node can provide services to the network, such as routing traffic in the network. In some instances, the application object can be deployed to a protected node; however, the operation can include moving the application object to a "safe node," for example, to quarantine the application object.

At 704, the operation can include determining the application object is subject to a network attack. In some instances, the operation 704 can include determining that a web server associated with the application object is under attack. In some instances, the operation can include determining that traffic is above a threshold level of traffic, above a historical threshold, a size of a packet queue is above a threshold size, a number of connections is above a threshold number, a QoS is below one or more thresholds, etc.

At 706, the operation can include instantiating a duplicate of the application object on a protected node. For example, the duplicate of the application object may be capable of providing the same services as the application object experiencing attack traffic. In some instances, the duplicate application object may duplicate the forwarding plane or routing table associated with the attacked node. In some instances, the protected node may be behind a firewall, or may include increased capabilities to handle the additional traffic or particulars of the traffic associated with the attack traffic.

At 708, the operation can include routing traffic associated with the network attack through the duplicate application object. In some instances, this operation can include updating one or more forwarding planes or routing tables on the unprotected node, the protected node, and/or the centralized server providing routing and forwarding for the virtualized network topology.

At 710, the operation can include inspecting and sanitizing traffic associated with the network attack. For example, the protected networking node may include additional inspecting, filtering, and/or sanitizing services and/or protocols to apply to network traffic. For example, the operation 708 may include routing the traffic associated with the attack traffic through heighted security protocols or other application objects to identify attack traffic and re-reroute the traffic, queue the traffic, drop the traffic, etc. In some instances, traffic may be inspected and/or sanitized based upon the source of the traffic, the destination of the traffic, content of the traffic, a protocol associated with the traffic, etc. In some instances, the operation 710 can be performed by a networking node with additional or surplus capacity relative to the unprotected node of the 702 such that that the node performing the operations 710 can handle the additional processing burden based on the attack traffic.

Thus, as discussed herein, the real-time traffic routing described in connection with the process 700 can occur easily by separating the physical interlink connection from the application and services provided by the application objects, with therefore allows the application traffic to be moved or redirected as needed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more modules stored in the memory and executable by the one or more processors to perform operations comprising:
receiving one or more specifications associated with network services to be provided by a networking application object;
determining at least a portion of a physical topology of a network, the determining comprising:
sending one or more first network probe messages to a first networking node:
receiving one or more second network probe messages from a second networking node, the one or more second network probe messages based at least in part on the one or more first network probe messages; and
identifying, based partly on the one or more second network probe messages, the portion of the physical topology of the network comprised of a first port associated with the first networking node, a first coordinate associated with the first networking node, a second port associated with the second networking node, and a second coordinate associated with the second networking node;
defining the networking application object to be deployed on the first networking node;
associating an Internet Protocol (IP) address of the networking application object with at least the first port of the first networking node; and
deploying the networking application object to the first networking node.

2. The system of claim 1, the operations further comprising:
determining a first forwarding plane associated with the first networking node and a second forwarding plane associated with the second networking node;
transmitting the first forwarding plane to the first networking node; and
transmitting the second forwarding plane to the second networking node.

3. The system of claim 1, the operations further comprising:
receiving one or more capabilities associated with the first networking node; and
determining that the one or more capabilities meet or exceed the one or more specifications associated with the networking application object.

4. The system of claim 1, wherein the networking application object is a first networking application object, the operations further comprising:
deploying a second networking application object to the second networking node, the second networking application object providing at least a portion of the network services;
associating the IP address with the second networking application object; and
routing network traffic from the first networking application object to the second networking application object in response to the deploying the second networking application object to the second networking node.

5. A system comprising:
one or more processors;
a memory; and
one or more modules stored in the memory and executable by the one or more processors to perform operations comprising:
determining at least a portion of a physical topology of a network, the determining comprising:
sending one or more network probe messages to one or more networking nodes; and
identifying the portion of the physical topology including at least one port of a networking node and a coordinate associated with the networking node;
defining a networking application object to be deployed on the networking node;
assigning an Internet Protocol (IP) address to the networking application object;
associating the IP address with the at least one port of the networking node; and
deploying the networking application object to the networking node.

6. The system of claim 5, wherein the networking application object uses at least Border Gateway Protocol (BGP) to establish routing of packets in the network.

7. The system of claim 5, wherein the networking node is a first networking node, the operations further comprising:
moving the networking application object from the first networking node to a second networking node without changing the IP address associated with the networking application object.

8. The system of claim 7, the operations further comprising updating a forwarding plane associated with the second networking node based at least in part on the moving the networking application object to the second networking node.

9. The system of claim 5, wherein sending the one or more network probe messages to the one or more networking nodes includes sending a first network probe message to a first networking node and receiving a second network probe message from a second networking node including at least first port information associated with the first networking node and second port information associated with the second networking node.

10. The system of claim 5, the operations further comprising:
determining a forwarding plane based at least in part on the portion of the physical topology of the network; and
transmitting the forwarding plane to the networking node to configure the networking node to route packets in accordance with the forwarding plane.

11. The system of claim 5, wherein the networking node is a first networking node, the operations further comprising:
determining that a number of network connections at the networking application object is above a connection threshold or determining that an amount of network traffic at the networking application object is above a traffic threshold; and
transferring the networking application object from the first networking node with a first network traffic capacity to a second networking node with a second network traffic capacity, wherein the second network traffic capacity is greater than the first network traffic capacity.

12. The system of claim 5, the operations further comprising:

receiving a specification associated with the networking application object; and defining the networking application object to provide a network service based at least in part on the specification, wherein the specification includes at least a Quality of Service (QoS) to be provided by the networking application object.

13. The system of claim 5, wherein the networking application object is configured to be implemented on the one or more networking nodes based at least in part on capabilities of the one or more networking nodes.

14. The system of claim 5, wherein the networking application object is a first networking application object, wherein the first networking application object and a second networking application object are implemented on the networking node, and wherein one or more first ports of the networking node are associated with a first network service provided by the first networking application object and one or more second ports of the networking node are associated with a second network service provided by the second networking application object.

15. A processor-implemented method comprising:

defining a networking application object to be deployed on a first networking node;

determining at least a portion of a physical topology of a network, the determining comprising:

sending one or more network probe messages to one or more networking nodes; and identifying the portion of the physical topology including at least one port of the first networking node and a coordinate associated with the first networking node;

assigning an Internet Protocol (IP) address to the networking application object;

associating the IP address with the at least one port of the first networking node; and deploying the networking application object to the first networking node; and moving the networking application object from the first networking node to a second networking node without changing the IP address associated with the networking application object; and updating a forwarding plane associated with the second networking node based at least in part on the moving the networking application object to the second networking node.

16. The processor-implemented method of claim 15, wherein sending the one or more network probe messages to the one or more networking nodes includes sending a first network probe message to the first networking node and receiving a second network probe message from the second networking node including at least first port information associated with the first networking node and second port information associated with the second networking node, the second network probe message based at least in part on the first network probe message.

17. The processor-implemented method of claim 15, wherein updating the forwarding plane further comprises:

determining an updated forwarding plane based at least in part on identifying the portion of the physical topology of the network; and transmitting the updated forwarding plane to the second networking node to configure the second networking node to route packets in accordance with the updated forwarding plane.

18. The processor-implemented method of claim 15, wherein method moving the networking application object further comprises:

determining that a number of network connections at the networking application object is above a connection threshold or determining that an amount of network traffic at the networking application object is above a traffic threshold; and transferring the networking application object from first networking node with a first network traffic capacity to the second networking node with a second network traffic capacity, the second network traffic capacity greater than the first network traffic capacity.

19. The system of claim 1, the operations further comprising:

determining that the networking application object has moved from the first networking node to the second networking node without changing the IP address; and updating a forwarding plane associated with the second networking node based at least in part on the networking application object moving to the second networking node.

20. The system of claim 1, the determining at least the portion of the physical topology of the network further comprising:

receiving one or more additional network probe messages from one or more additional networking nodes, the one or more additional network probe messages based at least in part on the one or more first network probe messages; and identifying, based partly on the one or more additional network probe messages, the portion of the physical topology of the network comprised of one or more additional networking nodes connected to the first networking node.

\* \* \* \* \*